United States Patent Office 3,413,273
Patented Nov. 26, 1968

3,413,273
PROCESS FOR VULCANIZATION OF ELASTOMERS WITH A SMALL AMOUNT OF UNSATURATION
Michel Jean Camille Alicot, Soisy-sous-Montmorency, and Georges Raymond Henry Mingasson, Paris, France, assignors to Etablissements Kuhlmann, Paris, France
No Drawing. Filed Aug. 2, 1966, Ser. No. 569,584
Claims priority, application France, Aug. 12, 1965, 28,139
5 Claims. (Cl. 260—79.5)

ABSTRACT OF THE DISCLOSURE

Acceleration of the vulcanization of elastomers with a small amount of unsaturation is accomplished using a tin salt of the formula

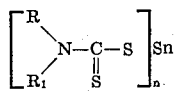

in which R and $R_1$ are the same or different and represent alkyl, cycloalkyl or aryl groups which may be linked together by a bond so as to form a nitrogen-containing heterocyclic ring, $n$ being equal to 2 or 4.

---

The present invention concerns a process for vulcanization of elastomers with a small amount of unsaturation.

The copolymerization of monoolefines with a small proportion of diolefines enables elastomers to be obtained having a small amount of unsaturation which, however, can be vulcanized with sulphur and vulcanization accelerators.

In the case of butyl rubber, for example, the elastomer is obtained by copolymerization of isobutylene with a small amount of a diolefine, generally isoprene. It is known that this elastomer, from the very fact of its small amount of unsaturation, is more difficult to vulcanize than natural rubber, in the case of vulcanization with sulphur. It has also been attempted to increase the action of the standard accelerators by the addition of very active substances, the most used of which are certain metallic dialkyldithiocarbamates. Among these, tellurium diethyldithiocarbamate is most used, which indeed enables a good vulcanization of butyl rubber to be obtained. However, this product imparts a grey colour to the vulcanizate material which in some applications may be inconvenient.

In the case of the elastomers known as E.P.D.M., at least two monoolefines, for example ethylene and propylene, are copolymerized with at least one copolymerizable diene, for example dicyclopentadiene. Just like butyl rubber, these E.P.D.M. elastomers are more difficult to vulcanize with sulphur and the standard accelerators than natural rubber.

It has now been found that divalent or tetravalent tin dithiocarbamates enable a very good vulcanization of elastomers with a small amount of unsaturation to be obtained. In the case of butyl rubber, vulcanized materials of a very light colour can also be obtained while increased protection against deterioration due to heat is ensured. In the case of the E.P.D.M. elastomers, these same tin dithiocarbamates likewise enable good residual deformation values to be obtained.

The tin dithiocarbamates which may be used for carrying out the invention are represented by the general formula:

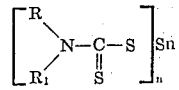  (I)

in which R and $R_1$ are the same or different and represent alkyl, cycloalkyl or aryl groups which may be linked together by a bond so as to form a nitrogen-containing heterocyclic ring, $n$ being equal to 2 or 4.

These derivatives may be prepared, for example, by double decomposition between a salt of tin of valency 2 or 4 and a salt of an N-substituted derivative of dithiocarbamic acid, as indicated below for the following products:

Divalent tin diethyldithiocarbamate
($R=R_1=C_2H_5$, $n=2$)

65 parts of anhydrous carbon disulphide are added to a solution of 128 parts of pure diethylamine in 1200 parts of anhydrous ethyl alcohol in a period of 1½ hours, at +10° C. with stirring, in an apparatus provided with a stirrer. After purging with a stream of dry nitrogen, a solution of 85 parts of anhydrous stannous chloride in 100 parts of anhydrous ethyl alcohol is added in a period of 30 minutes at the ambient temperature. After the introduction the mixture is stirred for a further 15 minutes and the solid filtered off, washed with a little ethyl alcohol and dried under vacuum. 141 parts of a product are obtained with an instantaneous melting point of 107–108° C. On recrystallization from ethyl alcohol, a product with an instantaneous melting point of 108–109° C. is obtained which is in the form of light beige crystals.

Calculated: C, 28.93; H, 4.82; N, 6.75; Sn, 28.62%.
Found: C, 29.04; H, 5.18; N, 6.86; Sn, 27.93%.

The parts indicated are parts by weight as well as in the following account.

Tetravalent tin diethyldithiocarbamate
($R=R_1=C_2H_5$, $n=4$)

30.5 parts of anhydrous carbon disulphide are added at +10° C. in a period of 1½ hours, with stirring, to a solution of 59.5 parts of pure diethylamine in 240 parts of anhydrous ethyl alcohol, in an apparatus provided with a stirrer. Stirring is continued for 15 minutes and then a solution of 26.6 parts of anhydrous stannic chloride in 40 parts of anhydrous ethyl alcohol is gradually added, still at +10° C. After the introduction is finished, the mixture is stirred for a further 30 minutes, and the solid filtered off, drained, washed with a little ethyl alcohol and dried under vacuum. 68 parts of tetravalent tin diethyldithiocarbamate of instantaneous melting point 169–170° C. are thus obtained; this salt is in the form of orange crystals.

Calculated: C, 33.76; H, 5.62; N, 7.87; Sn, 16.7%.
Found: C, 33.51; H, 5.89; N, 7.63; Sn, 16.5%.

Tetravalent tin dibutyldithiocarbamate of instantaneous melting point 118–120° C. and tetravalent tin diisobutyldithiocarbamate of instantaneous melting point 154–155° C. can be prepared by an analogous process.

The following examples, to which the invention is not limited, illustrate the invention

EXAMPLE 1

The following mixtures are prepared, from which the products used according to the invention can be compared with tellurium diethyldithiocarbamate

| | I | II | III | IV |
|---|---|---|---|---|
| Butyl rubber with 1.6% mol of unsaturation | 100 | 100 | 100 | 100 |
| Calcined kaolin | 100 | 100 | 100 | 100 |
| Stearic acid | 2 | 2 | 2 | 2 |
| Zinc oxide | 5 | 5 | 5 | 5 |
| Paraffin oil | 6 | 6 | 6 | 6 |
| Tetramethylthiuram disulphide | 1 | 1 | 1 | 1 |
| 2-mercaptobenzothiazole | 0.5 | 0.5 | 0.5 | 0.5 |
| Divalent tin diethyldithiocarbamate | | 1 | | |
| Tetravalent tin diethyldithiocarbamate | | | 1 | |
| Tellurium diethyldithiocarbamate | | | | 1 |
| Sulphur | 2 | 2 | 2 | 2 |

(a) Colour of the mixtures: Examination of the mixtures shows that those containing di- and tetravalent tin diethyldithiocarbamates remain creamy white, the same colour as the control mixture I, although that containing the tellurium diethyldithiocarbamate has become grey.

(b) The table below gives the properties of the mixtures defined above, the columns A to H having the following significance:

A—mixtures
B—scorch time $t_5$ according to Mooney
C—vulcanization index $t_{35}-t_5$ according to Mooney
D—period of vulcanization in minutes at 245° C.
E—modulus of the vulcanized material at 300% kg./cm.$^2$
F—resistance of the vulcanized material to rupture
G—stretching of the vulcanized material in percent
H—Shore hardness of the vulcanized material

| A | B | C | D | E | F | G | H |
|---|---|---|---|---|---|---|---|
| I | 20.0 | 12.7 | 10 | 6.8 | 58 | 1,045 | 35 |
|   |      |      | 15 | 8   | 71 | 980   | 40 |
|   |      |      | 20 | 9.6 | 76 | 925   | 43 |
|   |      |      | 30 | 11.2| 84 | 865   | 45 |
| II | 11.7 | 6.9 | 10 | 8.7 | 84 | 940   | 43 |
|   |      |      | 15 | 11.6| 89 | 860   | 45 |
|   |      |      | 20 | 12.1| 86 | 795   | 48 |
|   |      |      | 30 | 14.3| 79 | 715   | 50 |
| III | 13.4 | 8.6 | 10 | 10.8| 82 | 910 | 43 |
|   |      |      | 15 | 12.3| 92 | 830   | 46 |
|   |      |      | 20 | 14.4| 87 | 765   | 49 |
|   |      |      | 30 | 16.2| 81 | 685   | 50 |
| IV | 13.5 | 9.1 | 10 | 8.3 | 81 | 940   | 43 |
|   |      |      | 15 | 10.4| 88 | 860   | 46 |
|   |      |      | 20 | 12.6| 79 | 770   | 46 |
|   |      |      | 30 | 15.1| 75 | 690   | 50 |

EXAMPLE 2

The following mixtures were prepared:

|  | I | II | III |
|---|---|---|---|
| Butyl rubber with 1.6% mol of unsaturation | 100 | 100 | 100 |
| Calcined kaolin | 100 | 100 | 100 |
| Stearic acid | 2 | 2 | 2 |
| Zinc oxide | 5 | 5 | 5 |
| Paraffin oil | 6 | 6 | 6 |
| Tetramethylthiuram disulphide | 1 | 1 | 1 |
| Tetravalent tin diethyldithiocarbamate |  | 3 |  |
| Tellurium diethyldithiocarbamate |  |  | 3 |
| Sulphur | 1.5 | 1.5 | 1.5 |

The mixtures are vulcanized for 10 minutes at 155° C. and subjected to ageing in a Geer stove at 120° C. for three weeks.

BEFORE AGEING

|  | Resistance to rupture, Kg./cm.$^2$ | Stretching at rupture, percent |
|---|---|---|
| I | 75 | 965 |
| II | 72 | 805 |
| III | 73 | 760 |

AFTER AGEING

|  | Two weeks | | Three weeks | |
|---|---|---|---|---|
|  | Resistance to rupture, kg./cm.$^2$ | Stretching at rupture, percent | Resistance to rupture, kg./cm.$^2$ | Stretching at rupture, percent |
| I | 18 | 705 | 12 | 565 |
| II | 43 | 730 | 42 | 765 |
| III | 35 | 630 | 34 | 640 |

EXAMPLE 3

(a) The following mixtures are prepared, which show the properties of the vulcanized materials obtained on using the products of the invention:

|  | V | VI | VII | VIII |
|---|---|---|---|---|
| Terpolymer of ethylene and propylene, known as EPT 3509 | 100 | 100 | 100 | 100 |
| Carbon black, known as Noir FEF | 140 | 140 | 140 | 140 |
| Carbon black, known as Noir SRF | 60 | 60 | 60 | 60 |
| Naphthenic oil of viscosity according to Engler of 21 to 50°, known as "Esso-S-248" | 100 | 100 | 100 | 100 |
| Zinc oxide | 5 | 5 | 5 | 5 |
| Stearic acid | 1 | 1 | 1 | 1 |
| Sulphur | 1.5 | 1.5 | 1.5 | 1.5 |
| 2-mercaptobenzothiazole |  | 0.5 |  | 0.5 |
| Tetramethylthiuram disulphide | 1 | 1 | 1 | 1 |
| Tetravalent tin diethyldithiocarbamate |  |  | 2 | 2 |

(b) Mooney tests: The scorch time $t_5$ and the index vulcanization $t_{35}-t_5$ were determined on the Mooney viscosimeter regulated at 120° C. and 140° C. using the large rotor.

| Mixtures | Mooney tests at— | | | |
|---|---|---|---|---|
|  | 120° C. | | 140° C. | |
|  | $t_5$ | $t_{35}-t_5$ | $t_5$ | $t_{35}-t_5$ |
| V | 11.35 | 4.6 | 5.15 | 2.40 |
| VI | 11.4 | 4.9 | 4.85 | 1.30 |
| VII | 7.60 | 2.75 | 3.80 | 1.15 |
| VIII | 6.15 | 2.35 | 3.25 | 1.05 |

(c) Dynamometric properties: A series of vulcanizations was effected at 160° C. for variable periods, on 2 mm. plates, then the dynamometric properties of the vulcanizates thus obtained were determined:

| Dynamometric properties of the vulcanizate | Mixtures | Period of vulcanization at 160° C. in minutes | | | | | | | | |
|---|---|---|---|---|---|---|---|---|---|---|
|  |  | 5 | 10 | 20 | 30 | 40 | 50 | 60 | 75 | 90 |
| Modulus at 100% | V | 12 | 16 | 20 | 26 | 25 | 31 | 32 | 30 | 34 |
|  | VI | 22 | 28 | 34 | 36 | 44 | 43 | 42 | 44 | 44 |
|  | VII | 18 | 26 | 31 | 36 | 40 | 38 | 40 | 40 | 45 |
|  | VIII | 26 | 35 | 45 | 47 | 46 | 50 | 49 | 51 | 48 |
| Modulus at 200% | V | 15 | 27 | 36 | 46 | 49 | 59 | 54 | 57 | 60 |
|  | VI | 35 | 51 | 64 | 69 | 80 | 81 | 77 | 82 | 86 |
|  | VII | 32 | 47 | 57 | 69 | 78 | 78 | 79 | 80 | 86 |
|  | VIII | 49 | 66 | 85 | 89 | 92 | 97 | 94 | 96 | 94 |
| Resistance to rupture, kg./cm.$^2$ | V | 18 | 37 | 64 | 79 | 80 | 89 | 87 | 86 | 89 |
|  | VI | 63 | 85 | 97 | 99 | 105 | 105 | 102 | 105 | 108 |
|  | VII | 51 | 78 | 93 | 100 | 101 | 101 | 102 | 99 | 102 |
|  | VIII | 84 | 98 | 108 | 108 | 111 | 110 | 109 | 110 | 106 |
| Stretching, percent | V | 310 | 420 | 445 | 420 | 385 | 360 | 355 | 335 | 320 |
|  | VI | 530 | 455 | 380 | 335 | 310 | 300 | 285 | 280 | 265 |
|  | VII | 400 | 375 | 375 | 325 | 280 | 280 | 280 | 260 | 245 |
|  | VIII | 450 | 375 | 310 | 275 | 265 | 250 | 250 | 245 | 225 |

(d) Residual deformation tests: A test was effected of residual deformation after compression, at constant deformation, on test samples vulcanized for 60 minutes at 160° C. The test samples are crushed to 75% of their initial thickness during 22 hours at 70° C. The residual deformation is measured and expressed as a percentage of the deformation applied according to the formula:

$$\text{Residual deformation} = \frac{E_o - E_f}{E_o - E_{sc}} \times 100$$

in which $E_o$, $E_f$ and $E_{sc}$ represent respectively the initial thickness, the final thickness and the thickness under compression.

| Mixtures: | Residual deformation |
|---|---|
| V | 24.4 |
| VI | 16.5 |
| VII | 12.2 |
| VIII | 9.75 |

We claim:
1. In the process for the vulcanization of elastomers having a small amount of unsaturation in which a vulcanization accelerator is incorporated into the mixture to be vulcanized, the improvement comprising using as the vulcanization accelerator a tin salt of the formula:

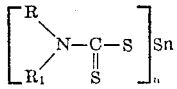

in which R and $R_1$ are the same or different and represent alkyl, cycloalkyl or aryl groups which may be linked together by a bond so as to form a nitrogen-containing heterocyclic ring, $n$ being equal to 2 or 4.

2. Process according to claim 1 wherein the tin salt is divalent tin diethyldithiocarbamate.

3. Process according to claim 1 wherein the tin salt is tetravalent tin diethyldithiocarbamate.

4. Process according to claim 1 wherein the tin salt is tetravalent tin dibutyldithiocarbamate.

5. Process according to claim 1 wherein the tin salt is tetravalent tin diisobutyldithiocarbamate.

References Cited

UNITED STATES PATENTS

| 3,086,955 | 4/1963 | Lemiszka | 260—79.5 |
| 2,696,492 | 12/1954 | Butler | 260—793 |

OTHER REFERENCES

Olliger et al.: Vulcanization of Elastomers, 1964, p. 160.

JOSEPH L. SCHOFER, *Primary Examiner.*

D. K. DENENBERG, *Assistant Examiner.*